United States Patent
Bodin et al.

(10) Patent No.: US 10,229,108 B2
(45) Date of Patent: Mar. 12, 2019

(54) SYSTEM AND METHOD FOR ADAPTIVE SPELL CHECKING

(71) Applicant: INTERNATIONAL BUSINESS MACHINES CORPORATION, Armonk, NY (US)

(72) Inventors: William K. Bodin, Austin, TX (US); Gregory J. Boss, Saginaw, MI (US); Rick A. Hamilton, II, Charlottesville, VA (US); John S. Langford, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 514 days.

(21) Appl. No.: 14/995,368

(22) Filed: Jan. 14, 2016

(65) Prior Publication Data

US 2016/0132545 A1    May 12, 2016

Related U.S. Application Data

(62) Division of application No. 11/614,740, filed on Dec. 21, 2006, now Pat. No. 9,275,036.

(51) Int. Cl.
*G06F 17/00* (2006.01)
*G06F 17/27* (2006.01)
*G06F 17/24* (2006.01)

(52) U.S. Cl.
CPC .......... *G06F 17/273* (2013.01); *G06F 17/276* (2013.01); *G06F 17/24* (2013.01)

(58) Field of Classification Search
CPC ..... G06F 17/273; G06F 17/274; G06F 17/276
See application file for complete search history.

(56) References Cited

U.S. PATENT DOCUMENTS

| 4,328,561 | A |   | 5/1982  | Convis et al. |
|-----------|---|---|---------|---------------|
| 4,355,371 | A |   | 10/1982 | Convis et al. |
| 4,744,050 | A | * | 5/1988  | Hirosawa ................ G06F 3/018 704/4 |
| 5,572,423 | A | * | 11/1996 | Church .................. G06F 17/273 715/257 |

(Continued)

FOREIGN PATENT DOCUMENTS

| JP | 2144763 A | 6/1990 |
| JP | H0474615  | 3/1992 |

(Continued)

OTHER PUBLICATIONS llttp://www.cloudmark.com/desktop/howitworks, pp. I through 2, printed Dec. 18, 2006.

(Continued)

*Primary Examiner* — Cesar B Paula
*Assistant Examiner* — David Faber
(74) *Attorney, Agent, or Firm* — Brian M. Restauro; Andrew M. Calderon; Roberts Mlotkowski Safran Cole & Calderon, P.C.

(57) ABSTRACT

A system and method for adaptive spell checking and correction. The method includes tracking frequencies of historical replacement strings of characters, and providing a list of "n" number of the historical replacement strings of characters in response to a string of characters which were previously changed or are not recognized.

20 Claims, 4 Drawing Sheets

(56) References Cited

U.S. PATENT DOCUMENTS

| | | | | |
|---|---|---|---|---|
| 5,956,739 | A * | 9/1999 | Golding | G06F 17/273 715/209 |
| 6,047,300 | A * | 4/2000 | Walfish | G06F 17/273 715/257 |
| 6,144,958 | A * | 11/2000 | Ortega | G06F 17/2725 |
| 6,393,389 | B1 * | 5/2002 | Chanod | G06F 17/271 704/4 |
| 6,401,084 | B1 * | 6/2002 | Ortega | G06F 17/2725 704/5 |
| 6,424,983 | B1 | 7/2002 | Schabes et al. | |
| 6,564,213 | B1 * | 5/2003 | Ortega | G06F 17/3064 |
| 6,732,333 | B2 * | 5/2004 | Selby | G06F 17/273 715/257 |
| 6,918,086 | B2 * | 7/2005 | Rogson | G06F 17/273 715/257 |
| 7,088,345 | B2 * | 8/2006 | Robinson | G06F 3/0219 345/172 |
| 7,107,204 | B1 * | 9/2006 | Liu | G06F 17/273 704/2 |
| 7,149,970 | B1 * | 12/2006 | Pratley | G06F 17/273 715/257 |
| 7,296,019 | B1 * | 11/2007 | Chandrasekar | G06F 17/273 |
| 7,451,392 | B1 * | 11/2008 | Chalecki | G06F 17/2247 707/E17.061 |
| 7,587,385 | B2 * | 9/2009 | Vayssiere | G06F 17/276 |
| 7,617,202 | B2 * | 11/2009 | Brill | G06F 17/30867 |
| 7,650,348 | B2 * | 1/2010 | Lowles | G06F 1/1626 707/999.101 |
| 8,380,512 | B2 * | 2/2013 | Bonforte | G06F 17/30755 704/270 |
| 2002/0010726 | A1 * | 1/2002 | Rogson | G06F 17/273 715/257 |
| 2002/0095448 | A1 * | 7/2002 | Selby | G06F 17/273 715/257 |
| 2003/0101044 | A1 * | 5/2003 | Krasnov | G06F 17/2827 704/4 |
| 2003/0145285 | A1 | 7/2003 | Miyahira et al. | |
| 2004/0250208 | A1 | 12/2004 | Nelmes et al. | |
| 2005/0246365 | A1 | 11/2005 | Lowles et al. | |
| 2005/0283726 | A1 * | 12/2005 | Lunati | G06F 17/273 715/257 |
| 2006/0117003 | A1 * | 6/2006 | Ortega | G06F 17/2725 |
| 2006/0241944 | A1 * | 10/2006 | Potter | G06F 17/2795 704/254 |
| 2008/0189605 | A1 * | 8/2008 | Kay | G06F 3/0237 715/257 |

FOREIGN PATENT DOCUMENTS

| | | |
|---|---|---|
| JP | 5054029 A | 3/1993 |
| JP | 9274615 A | 10/1997 |
| JP | 10134049 A | 5/1998 |
| JP | 2000330984 A | 11/2000 |
| JP | 2002091960 A | 3/2002 |
| JP | 2005258888 A | 9/2005 |

OTHER PUBLICATIONS

1ttn://www.cloudmark.com/desk1op/communitv, p. I of I, printed Dec. 18, 2006.

SpellCheckAnywhere.com, "Spell Check Anywhere", Publish and known to the public as of Dec. 12, 2005, SpellCheckAnywhere. com, pp. 1-9; http://web.archive.org/web/20051212051631/http://www.spellcheckanywhere.com.

\* cited by examiner user weight = (user frequency) * 100 / Σ(all user frequencies)   (1)

community weight = (community frequency) * 100 / Σ(all community frequencies)   (2)

combined weight = user weight + ((weighting factor) * (community weight))   (3)

FIG. 2

| Input Word | Replacement Word | User Frequency | User Weight | Community Frequency | Community Weight | Community Weight * Weighting Factor | Combined Weight |
|---|---|---|---|---|---|---|---|
| resead | recede | 4 | 33.33 | 9180 | 7.71 | 5.79 | 39.12 |
| resead | reseed | 3 | 25.00 | 46294 | 38.90 | 29.17 | 54.17 |
| resead | reread | 2 | 16.67 | 15681 | 13.18 | 9.88 | 26.55 |
| resead | reseat | 1 | 8.33 | 17103 | 14.37 | 10.78 | 19.11 |
| resead | resend | 1 | 8.33 | 16212 | 13.62 | 10.22 | 18.55 |
| resead | reseal | 1 | 8.33 | 14543 | 12.22 | 9.16 | 17.50 |

FIG. 3

SYSTEM AND METHOD FOR ADAPTIVE SPELL CHECKING

FIELD OF THE INVENTION

The invention generally relates to a system and method for spell checking and correction, and more particularly to a system and method for an adaptive spell checker based upon a mapping of an individual user's, or a community of users', historical spelling patterns.

BACKGROUND OF THE INVENTION

Conventional spelling correction systems (e.g., spell-checkers) for electronic documents, such as those found in common word processing applications, operate on a word-by-word basis and check whether each word in a document is found in a dictionary. The dictionary may comprise, for example, a predetermined list of valid strings of characters that is stored and/or accessed by the spell-checker. When a word is found to have a match in the dictionary, the word is treated as correctly spelled. However, when a word is not found in the dictionary, the word is indicated as incorrectly spelled. Incorrectly spelled words may be identified for the user by, for example, underlining and/or highlighting.

Many conventional spell-checking programs not only detect misspelled words, but also offer a selection of alternative words as suggested replacements for the misspelled word. These alternative word choices may be presented in a ranked order according to their likelihood of being the word that the user was trying to type. The alternative words that populate the list of suggested replacements are selected from a static set of replacement word choices (e.g., the dictionary) with, perhaps, a few valid alternative suffix rules applied.

For example, if a user intended to type the word "recede" but instead typed "reseed", a typical spell-checker may detect the misspelled word and present the following alternative words as suggested replacements in the following ranked order:
reseed
reseat
resend
reread
reseal.

These are simply correctly spelled words from a static list of valid words (e.g., a dictionary) that closely match the character sequence of the misspelled word. Such a list of alternative words is often useful when the spelling mistake is the result of a "finger slip" (e.g., an omission of a character of a word, an addition of an extra character in a word, a substitution of a character for a character of a word, or the transposition in order of characters within a word).

If the mistake is an actual spelling mistake, however, instead of a finger slip, the user must manually enter the correct word (in this case "recede") after, for example, looking it up in a dictionary or asking someone how to spell it. Thus, when using conventional spell checkers, users may be inconvenienced when misspelled words are the result of something other than a mere finger slip.

Accordingly, there exists a need in the art to overcome the deficiencies and limitations described hereinabove.

SUMMARY OF THE INVENTION

In a first aspect of the invention, a method comprises tracking frequencies of historical replacement strings of characters. The method further comprises providing a list of "n" number of the historical replacement strings of characters in response to a string of characters which were previously changed or are not recognized.

In a second aspect of the invention, a method of providing a spell check for a plurality of users comprises retrieving or receiving data from at least one of the plurality of users. The method further comprises updating a data structure based upon the data, identifying a character string, and providing at least one replacement character string for the identified character string based upon the data structure.

In a third aspect of the invention, a computer program product comprising a computer useable medium includes a computer readable program. The computer readable program, when executed on a computer, causes the computer to identify an unrecognized or previously changed character string. The computer readable program, when executed on a computer, further causes the computer to provide at least one replacement character string for the unrecognized or previously changed character string based upon data associated with historical replacements of the unrecognized or previously changed character string. The computer readable program, when executed on a computer, further causes the computer to replace the character string and update the data based upon the replacement.

In a fourth aspect of the invention a method for deploying an application for checking spelling comprises providing a computer infrastructure being operable to track frequencies of historical replacement character strings. The computer infrastructure is further operable to provide a list of "n" number of the historical replacement character strings in response to a character string which was previously changed or is not recognized.

In a fifth aspect of the invention, a system comprises a server having a database containing data associated with historical replacements of character strings. The system further comprises at least one of a hardware and software component for checking spelling. The system operates to identify an unrecognized or previously replaced character string in electronic text. The system further operates to provide, based upon the data associated with historical replacement of character strings, at least one replacement character string for the unrecognized or previously replaced character string.

BRIEF DESCRIPTION OF THE DRAWINGS

FIG. 2 shows an exemplary formulation for ranking suggested replacements;
FIG. 3 shows a ranking according to the formulation of FIG. 2.

DETAILED DESCRIPTION OF EMBODIMENTS OF THE INVENTION

The invention is directed to a system and method for spelling correction. The invention provides a spell-checker that learns from previous replacement words selected by, and from new replacement words entered by, the immediate user and/or other users in the same community. In this manner, the spell-checker becomes more accurate in its list of word replacement choices by adapting to the user's historical patterns of replacement. Moreover, implementations may be employed that learn and adapt from the historical replacements of a group, or groups, of plural users. In this manner, the spell-checker enables new words to enter a groups' vocabulary. Accordingly, the invention may be used to provide improved checking and/or correction of the spelling of words, particularly in electronic documents.

Figure 1:
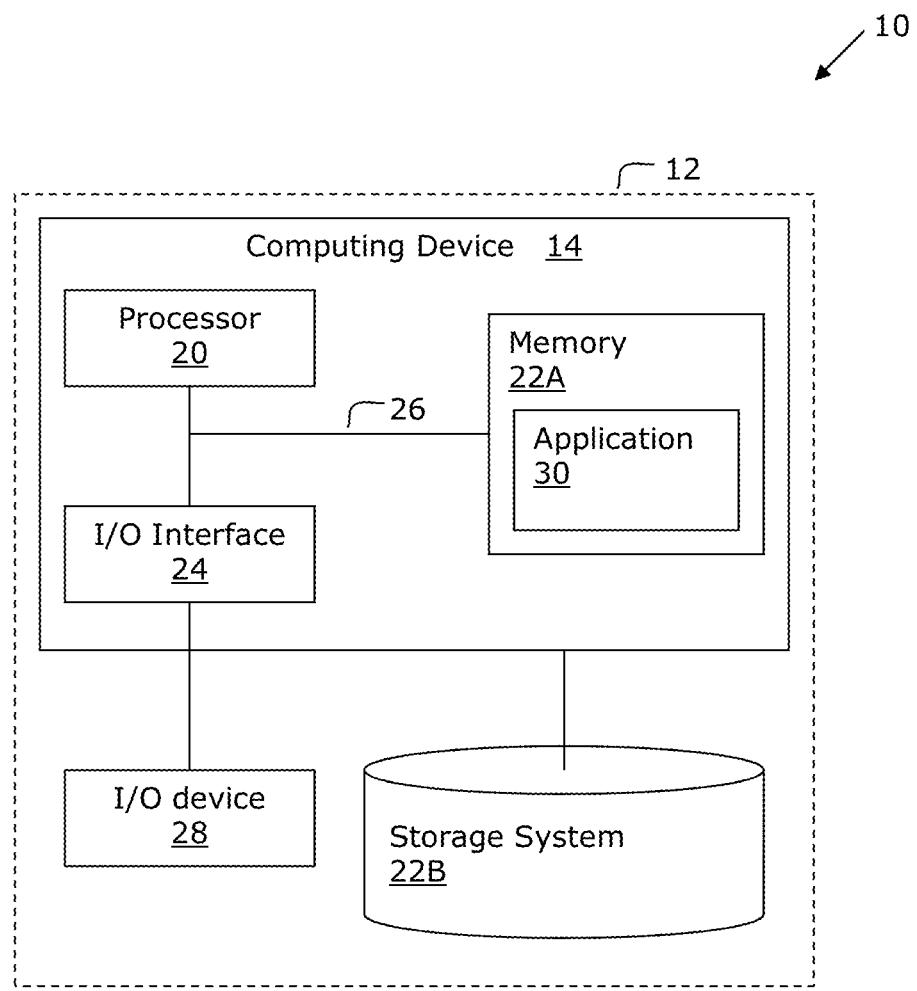
FIG. 1 shows an environment according to aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises an application 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to perform processes described herein, such as, for example, provide an adaptive spell checker that learns from a user's, or users', historical replacement of words.

In embodiments, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In embodiments, the invention provides a business method that performs the process steps of the invention on a subscription, advertising, and/or fee basis. That is, a service provider, such as a Solution Integrator, could offer to provide spell checking. In this case, the service provider can create, deploy, maintain, and/or support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In embodiments, the invention comprises maintaining a list of misspelled words and the replacements that have been selected or input by a user for replacing the respective misspelled word. Lists of misspelled words, replacements, and other data may be maintained in any suitable fashion, such as, for example, by storing in local memory or remotely in a database. Techniques for storing and accessing data are known in the art. While the invention is described in terms of words, it is understood that a word comprises any character string that is input (e.g., typed, pasted, downloaded, etc.) by a user. The character string (i.e., string of individual characters) may comprise any type of characters, such as, for example, letters, numbers, symbols, special characters, etc. Moreover, by treating words as strings of characters, the invention is not limited to words of a particular language.

In implementations, misspelled words may be identified in any suitable manner. Techniques for identifying misspelled words and for storing and accessing data are known and further description is not believed necessary. For example, the spelling of a word may be compared to a predefined list of words (e.g., the dictionary) by hashing the word and comparing it to a hashing table that corresponds to the predefined list.

In an embodiment of the invention, a user's replacement history data for correcting a misspelled word (or a previously changed word, as described below) may be provided in a table. For example, the replacement history data for the misspelled (or previously changed) word "resead" is shown in Table 1. The first column shows the misspelled word as it was entered (e.g., typed) by the user. The second column shows the word that the user selected (either from a list or by typing anew) to replace the misspelled word. The third column shows the frequency of replacement (i.e., how many times the user has replaced the word in the first column with the word in the second column).

TABLE 1

| Misspelled Word | Replacement | Frequency |
| --- | --- | --- |
| resead | recede | 4 |
| resead | reseed | 2 |
| resead | reread | 1 |

By tracking the history of replacements for a particular misspelled (or previously changed) word, the spell checker of the present invention may present the "n" most frequent replacements to the user the next time the word is misspelled or recognized as a word which was previously changed by the user. It is noted that "n" may be any suitable integer value greater than zero. Moreover, the "n" most frequent replacements that are presented to the user may be presented in ranked descending order beginning with the most frequent replacement at the top of the list. For example, the next time the user types the word "reseed", the spell checker of the present invention may present a list of possible replacements to the user with the word "recede" appearing at the top of the list because it has a frequency of four, the word "reseed" appearing next in the list because it has a frequency of two, and the word "reread" appearing next in the list because it has a frequency of one.

It is noted that the replacements and frequencies (and any other pertinent data) may be stored, accessed, and updated in known ways (e.g., using computer memory, databases, etc.). Moreover, when a word is misspelled (or recognized as previously changed), the list of possible replacements may be displayed to the user in any known way, such as, for example by superimposed list, dialog box, etc. Furthermore, the value of "n" may be any integer greater than zero and may be designated, for example, by a system designer, administrator, or user.

In embodiments, the replacement history data for a particular misspelled word (or word which was previously changed) may be seeded with a list of initial replacement words. The initial replacement words may be determined, for example, using conventional spell checking routines (e.g., hashing). Furthermore, each initial replacement word may be assigned an initial frequency, such as, for example, a frequency of 1. For example, the replacement history data for the misspelled word "resead" may be seeded with the data shown in Table 2.

TABLE 2

| Misspelled Word | Replacement | Frequency |
| --- | --- | --- |
| resead | reseed | 1 |
| resead | reseat | 1 |
| resead | resend | 1 |
| resead | reread | 1 |
| resead | reseal | 1 |

Beginning with the initial seeded replacement history data shown in Table 2, if a user misspells the word "resead" seven times, and replaces it with "recede" four times, "reseed" two times, and "reread" one time, then the replacement history data will look like that shown in Table 3.

TABLE 3

| Misspelled Word | Replacement | Frequency |
| --- | --- | --- |
| resead | recede | 4 |
| resead | reseed | 3 |
| resead | reread | 2 |
| resead | reseat | 1 |
| resead | resend | 1 |
| resead | reseal | 1 |

Continuing the example, if "n" has a value of four, then the next time the user types the word "reseed", the spell checker will present a list of four suggested replacements in the following order: "recede", "reseed", "reread", and "reseat".

While the above-described examples have been described in terms of misspelled words, embodiments of the invention also operate in a similar fashion with any word that is input (e.g., typed) and then changed (e.g., re-typed) by the user (i.e., previously changed words). For example, a user may input a word that is not detected as misspelled (e.g., "night"). The user may subsequently change the word to another word (e.g., from "night" to "knight"). Implementations of the invention recognize this correction and store appropriate data (original word, replacement word, frequency, etc.) in a fashion similar to that described above. In this manner, replacement history data and associated learned suggested replacements may be provided for any word, whether the word was initially misspelled or not.

In embodiments of the invention, an automatic replacement mechanism may be employed. For example, a predefined threshold for automatic replacement may be designated by the system designer, administrator, or user. More specifically, when a word is input, if the frequency of a single replacement in the replacement history data accounts for a percentage of the sum of all of the frequencies that exceeds the threshold, then the input word is automatically replaced with that replacement without any user input. For example, the user input word "chemp" may have a replacement history data as shown in Table 4.

TABLE 4

| Misspelled Word | Replacement | Frequency |
| --- | --- | --- |
| chemp | chimp | 49 |
| chemp | champ | 2 |
| chemp | chomp | 1 |
| chemp | chump | 1 |

The frequency of the replacement "chimp" amounts to roughly 92.4% of the total replacements (i.e., 49 out of 53). If the threshold is set at, for example, 90%, then embodiments of the invention will automatically replace the original word "chemp" with "chimp" because the frequency of "chimp" compared to the total number of replacements exceeds the threshold. Techniques for such comparison and automatic replacement are known and further description is not believed necessary.

Embodiments of the invention may be implemented as a stand alone application or as a component of another application. For example, processes of the invention may be integrated as the spell-checking feature of word-processing, spreadsheet, and/or email software. In such an application, the spell checking processes of the invention may be used to check and correct words on a word-by-word basis, or, for example, on a document-by-document basis. Alternatively, processes of the invention may be implemented in a stand alone executable application that runs on a computing device (e.g., desktop personal computer). For example, if the invention is implemented in a stand alone application, a user may export (e.g., cut and paste, send, email, etc.) a block of text from another application (e.g., word processor) into the stand alone application. The processes of the invention can be run on the block of text, and then the processed block of text may be returned to the initial application. Similarly, processes of the invention may be implemented in an application that resides at a central location (e.g., server, service provider, etc.). Individual users may send a block of text (or a whole document) to the central location for processing according to the invention, and may receive back a processed block of text (or whole document).

Implementations of the invention may be used with groups of users, as well as single users as described above. For example, a community may be defined as a group of individual users. The individual replacement history data for every user of the community may be combined and stored as a community replacement history data. When an individual user inputs a word, the spell checker will present suggested replacements based upon the community replacement history data. In this manner, the spell checker may learn from multiple users. For example, Table 5 shows exemplary community replacement history data for the word "reseal".

TABLE 5

| Misspelled Word | Replacement | Community Frequency |
|---|---|---|
| resead | recede | 9180 |
| resead | reseed | 46294 |
| resead | reread | 15681 |
| resead | reseat | 17103 |
| resead | resend | 16212 |
| resead | reseal | 14543 |

Based upon the values shown in Table 5, if an individual user of the community inputs the word "reseal", and if "n" equals four, then the inventive spell checker will present the following as suggested replacements (in order based upon the community frequency): "reseed", "reseat", "resend", "reread".

As is apparent from the example shown in Table 5, the frequencies of the replacements of the community may greatly outweigh those of a particular user. Therefore, in embodiments, the priority of suggested replacements for a user of a community may be formulated in any desired fashion. An exemplary formulation involves normalizing the user frequencies and the community frequencies, weighting the respective normalized frequencies, combining the respective weighted frequencies, and ordering the suggested replacements based upon the respective combined values. This exemplary formulation may be implemented using the equations shown in FIG. 2.

For example, an individual user of a community may have replacement history data such as that shown in Table 3. Moreover, the community replacement history data may be that shown in Table 5. Assuming a weighting factor of 0.75, the combined weight for each of the possible replacements, according to Equations (1), (2), and (3) of FIG. 2., is demonstrated in FIG. 3.

As should be apparent from the table of FIG. 3, the next time this particular user inputs the word "reseed", assuming a value of four for "n", the suggested replacements will be ranked according to the combined weight and will be presented as follows: "reseed", "recede", "reread", "reseat". In this way, the suggested replacements are still based upon data from the community, but are skewed toward the individual user's own personal history. It is noted that any formulation may be utilized to arrive at the combined weight. Moreover, if the above described formulation (i.e., Equations (1), (2), and (3)) is used, the weighting factor is not limited to 0.75, but, rather, may be any desired number.

The data that populates the community replacement history data may be stored at a central location (e.g., server, database etc.). The central location may include an application that passively receives and/or actively gathers data from each of the individual users of the community. For example, a server that is linked to a network of users of the community may continuously monitor all user activity (e.g., replacements) and update the community replacement history data accordingly. Alternatively, if a user of a community has been working offline, the user's replacement data may be automatically or manually uploaded to the server when the user next connects to the network.

In embodiments, the community replacement history data is stored in an open standards based repository. For example, the data may be stored in a database that is operable to communicate with numerous different types of applications and operating systems. In this way, multiple users that employ different types of hardware and/or software may be treated as a community as described above.

Individuals may be associated with a community in any suitable fashion. For example, a particular machine (e.g., workstation) may be associated with a community such that anyone who uses the machine is considered part of the community. In this way, any replacements that occur on that machine (during use of any application, such as, for example, word processor, spreadsheet, email, etc.) will be included in the community replacement history data. Alternatively, a user account may be associated with a community such that a user who logs on to the account (e.g., by username, password, etc.) is considered part of the community. In this way, any replacements that occur during use of that account (during use of any application, such as, for example, word processor, spreadsheet, email, etc.) will be included in the community replacement history data. Alternatively, a user may be a member of multiple communities and may select a particular community in an application (e.g., word processor) that the user is operating in, such as, for example, by choosing the particular community from a list of available communities (e.g., in a drop down menu). In this way, any replacements that occur during use of that application will be included in the particular community replacement history data.

Method of Use

Figure 4:
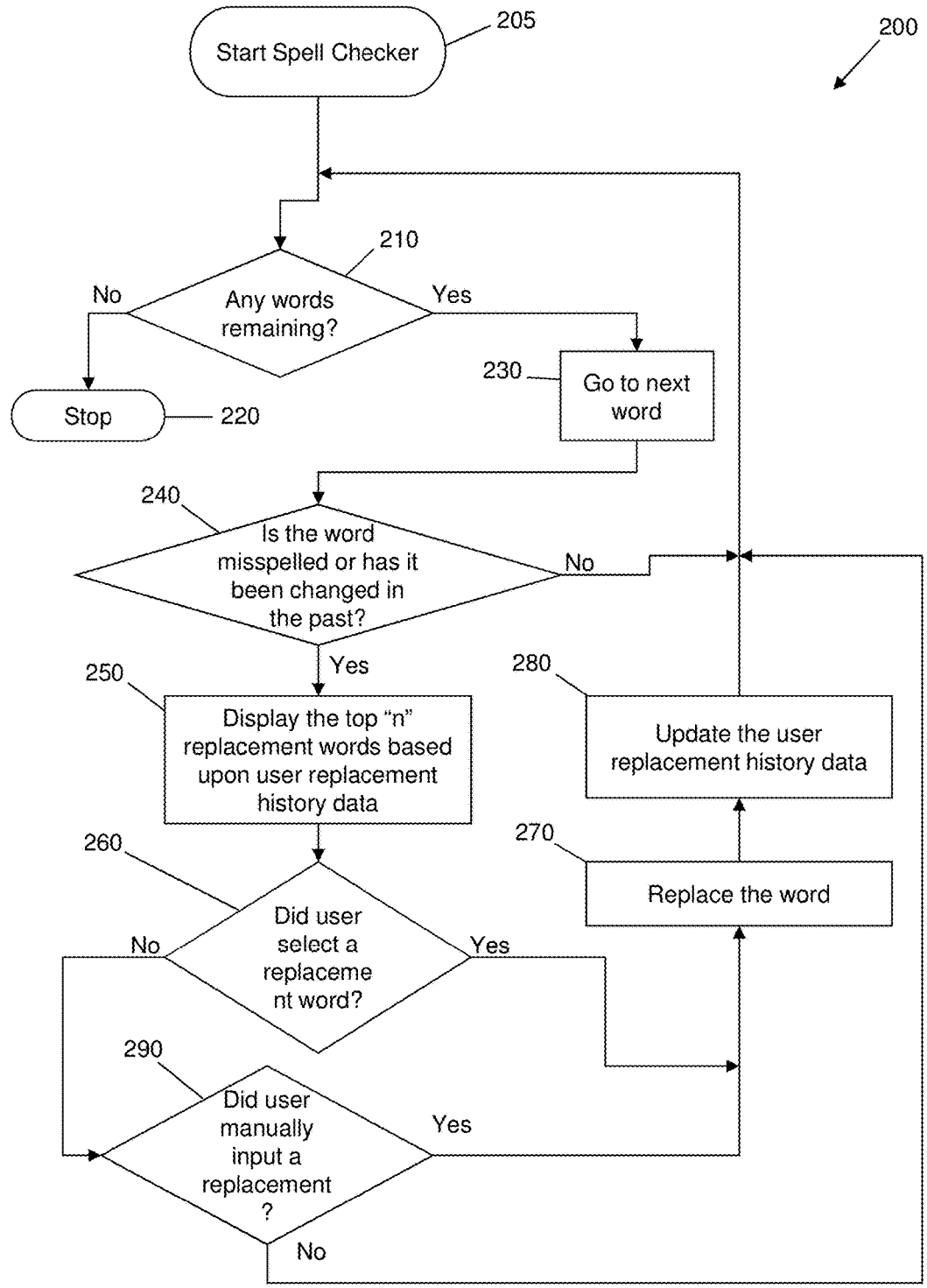
FIGS. 4 and 5 show flow diagrams depicting methods according to aspects of the invention.

FIG. 4 is a flow diagram implementing steps of the invention. FIG. 4 (and all other flow diagrams) may equally represent a high-level block diagram of the invention. The steps of FIG. 4 (and all other flow diagrams) may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

FIG. 4 shows a flow diagram depicting a method 200 for checking the spelling of text according to aspects of the invention. The method 200 is directed toward embodiments associated with a single user. At step 205, the spell checker is started. This may include, for example, executing a stand alone software application, executing a component application of a larger application, etc. This may also include identifying or receiving a document or block of text to be analyzed (including operating on a word-by-word basis as words are typed).

At step 210, a determination is made if any words are remaining to be checked. This may be accomplished in any suitable manner, such as, for example, by providing programming that looks ahead for characters that indicate the end of the document, the beginning of another word, etc. If there are no more words remaining to be analyzed, then the spell checker is stopped at 220. If there are words remaining, then the application advances to the next word to be analyzed at 230.

Still referring to FIG. 4, at step 240, a determination is made as to whether the word being analyzed is misspelled or has been changed in the past. Misspelled words may be identified in any suitable manner, such as, for example, by employing hashing routines, as described above and which are known to those of skill in the art. Words that are not considered as misspelled, but have been manually changed by the user in the past, will have a replacement history data table, such as that shown, for example, in Table 3. To determine which words have been changed in the past, the system and method may make such identification by employing a routine that examines the available replacement history data tables for all words via a hashing routine. Other techniques, however, may be employed for identifying words that are not misspelled but have been changed in the past, as should be known to one of ordinary skill in the art.

If the word is not identified as either misspelled (e.g., unrecognized) or changed in the past, then the method returns to step 210. If, however, the word is identified as misspelled or changed in the past, then the top "n" replacement words based upon the user replacement history data for that word is displayed at step 250. In embodiments, this includes examining the replacement history data for that particular word, and displaying (as suggested replacements) the top "n" replacement words in ranked order of historical replacement frequency, as described above. The display may be embodied in any suitable form, such as, for example, a dialog box, superimposed list, etc. Moreover, as described above, the value of "n" may be any integer value grater than zero that is designated by the method designer, system administrator, or user.

As an optional feature at step 250, the method may allow the user to show more than "n" suggested replacements. For example, if the value of "n" is four and there are ten historical replacements in the replacement history data for the particular word, then the user may optionally be presented with any number grater than "n" replacements (e.g., seven instead of four). Also, in embodiments, the method includes an option for the user to see all of the possible replacements in the replacement history data if the user is not satisfied with the top "n" replacements. For example, after the top "n" replacements are displayed, the user may change the display to view more than "n" of the possible replacements by performing a certain task, such as, for example, a predefined keystroke, clicking a button with the mouse pointer, etc.

Still referring to FIG. 4, at step 260, a determination is made if the user selected a replacement from the displayed list of suggested replacements. If the user did select a replacement (such as, for example, by clicking a mouse cursor on one of the replacement words in the displayed list), then the original misspelled or previously changed word is replaced with the selected replacement word at step 270. The replacement may be accomplished in any suitable manner, as is apparent to the skilled artisan. Moreover, after a word has been replaced in step 270, the user's replacement history data for the original misspelled or previously changed word is updated at step 280. For example, in embodiments, the frequency value of the replacement word may be incremented by a value of one. At this point, the method returns to step 210.

If, at step 260, the user did not select one of the suggested replacement words, then the method proceeds to step 290. At step 290, a determination is made as to whether the user manually input a replacement word for the original misspelled or previously changed word. For example, the user may have highlighted the original misspelled or previously changed word, deleted it, and re-typed a different word. Other methods of inputting a manually replacement for the original misspelled or previously changed word are contemplated by the invention, and will be apparent to those of ordinary skill in the art.

If, at step 290, the user does manually input a replacement word for the original misspelled or previously changed word, then the method proceeds to steps 270 and 280, as described above. If, at step 290, the user does not manually input a replacement word, then the method proceeds to step 210. That is, the misspelled or previously changed word remains unchanged and the spell checker proceeds to the next word, if one exists.

Figure 5:
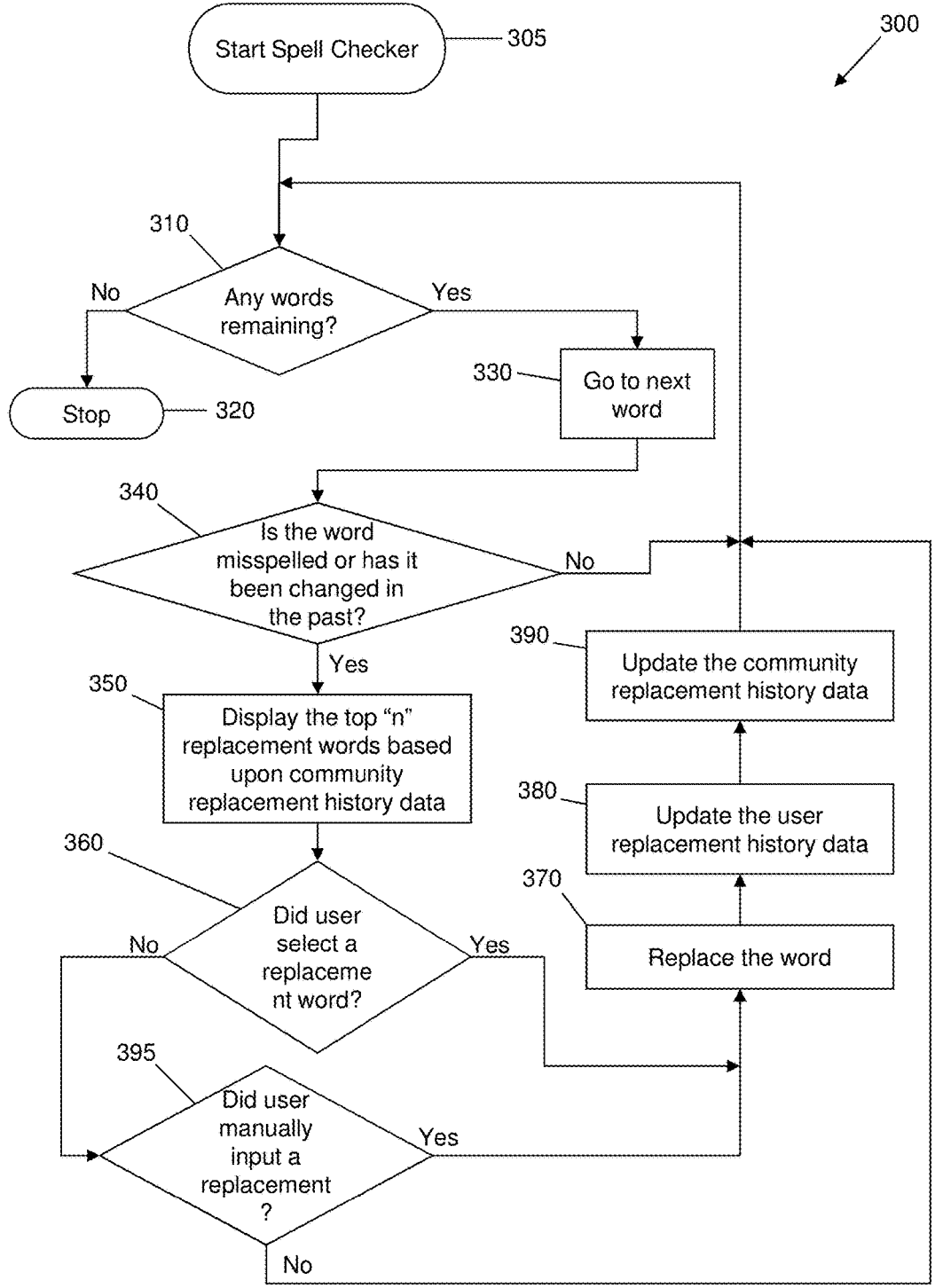

FIG. 5 shows a flow diagram depicting a method 300 for checking the spelling of text according to aspects of the invention. The method 300 is directed toward embodiments involving an individual user that is associated with a community of users, as described above. At step 305, the spell checker is started. This may include, for example, executing a stand alone software application, executing a component application of a larger application, etc. This may also include identifying or receiving a document or block of text to be analyzed (including operating on a word-by-word basis as words are typed).

At step 310, a determination is made if any words are remaining to be checked. This may be accomplished in any suitable manner, such as, for example, by providing programming that looks ahead for characters that indicate the end of the document, the beginning of another word, etc. If there are no more words remaining to be analyzed, then the spell checker is stopped at 320. If there are words remaining, then the application advances to the next word to be analyzed at 330.

Still referring to FIG. 5, at step 340, a determination is made as to whether the word being analyzed is misspelled or has been changed by any user in the community in the past. Misspelled words may be identified in any suitable manner, such as, for example, by employing hashing routines, as described above. Words that are not considered as misspelled, but have been manually changed by any user in the community in the past, will have a replacement history data table, such as that shown, for example, in Table 5. Thus, words that are not misspelled but have been changed in the past may be identified by a routine that examines the available replacement history data tables as described above. Other techniques, however, may be employed for identifying words that are not misspelled but have been changed in the past, as will be apparent to one of ordinary skill in the art.

If the word is not identified as either misspelled or changed in the past, then the method returns to step 310. If, however, the word is identified as misspelled or changed in the past, then the top "n" replacement words based upon the community replacement history data for that word is displayed at step 350. In embodiments, this includes examining the replacement history data for that particular word, and displaying (as suggested replacements) the top "n" replacement words in ranked order of historical replacement frequency, as described above. For example, the suggested replacements may be ranked in order of community frequency. Alternatively, step 350 may comprise formulating priorities for the possible replacements, such as, for example, described above with respect to FIGS. 2 and 3. The display of ranked suggested replacements may be embodied in any suitable form, such as, for example, a dialog box, superimposed list, etc. Moreover, as described above, the value of "n" may be any integer value grater than zero that is designated by the method designer, system administrator, or user.

As an optional feature at step 350, the method may allow the user to show more than "n" suggested replacements. For example, if the value of "n" is four and there are ten historical replacements in the replacement history data for the particular word, then the user may optionally be presented with any number grater than "n" replacements (e.g., seven instead of four). Also, in embodiments, the method includes an option for the user to see all of the possible replacements in the replacement history data if the user is not satisfied with the top "n" replacements. For example, after the top "n" replacements are displayed, the user may change the display to view more than "n" of the possible replacements by performing a certain task, such as, for example, a predefined keystroke, clicking a button with the mouse pointer, etc.

Still referring to FIG. 5, at step 360, a determination is made if the user selected a replacement from the displayed list of suggested replacements. If the user did select a replacement (such as, for example, by clicking a mouse cursor on one of the replacement words in the displayed list), then the original misspelled or previously changed word is replaced with the selected replacement word at step 370. The replacement may be accomplished in any suitable manner, as is apparent to the skilled artisan. Moreover, after a word has been replaced in step 370, the user's replacement history data for the original misspelled or previously changed word is updated at step 380. In embodiments, the frequency value of the replacement word may be incremented, for example, by a value of one.

Additionally, the community replacement history data for the original misspelled or previously changed word is updated at step 390. For example, the frequency value of the replacement word may be incremented by a value of one. As described above, the community replacement history data may be stored, accessed, and modified at a remote location by a remote application. At this point, the method returns to step 310.

If, at step 360, the user did not select one of the suggested replacement words, then the method proceeds to step 395. At step 395, a determination is made as to whether the user manually input a replacement word for the original misspelled or previously changed word. For example, the user may have highlighted the original misspelled or previously changed word, deleted it, and re-typed a different word. Other methods of inputting a manually replacement for the original misspelled or previously changed word are contemplated by the invention, and will be apparent to those of ordinary skill in the art.

If, at step 395, the user does manually input a replacement word for the original misspelled or previously changed word, then the method proceeds to steps 370, 380, and 390, as described above. If, at step 395, the user does not manually input a replacement word, then the method proceeds to step 310. That is, the misspelled or previously changed word remains unchanged and the spell checker proceeds to the next word, if one exists.

Implementations of the invention provide improved spell checking and correction capabilities that can be integrated into an application or performed as a stand alone application. Embodiments adaptively employ a historical correction patterns to learn preferred replacements for particular words. The method and system may be based upon an individual user's and/or a community of users' historical correction patterns. In this manner, implementations of the invention provide a more accurate list of suggested word replacement choices. Moreover, implementations allow new words to enter a community's vocabulary, and provide for increased or decreased priority of ranking based upon frequency of replacement.

While the invention has been described in terms of embodiments, those skilled in the art will recognize that the invention can be practiced with modifications and in the spirit and scope of the appended claims.

What is claimed:

1. A method of providing a spell check for a plurality of users, comprising:
retrieving or receiving data from at least one of the plurality of users;
updating a data structure based upon the data;
identifying a character string; and
providing at least one replacement character string for the identified character string based upon the data structure when the identified character string is misspelled or previously replaced,
wherein the providing comprises:
weighting respective frequencies of a particular user and the at least one of the plurality of users to generate a user weight for the particular user and a community weight for the at least one of the plurality of users;
combining the respective weighted frequencies of the particular user and the at least one of the plurality of users by summing the user weight for the particular user and the community weight for the at least one of the plurality of users; and
ordering the at least one replacement character string in a list based on the combined weighted frequencies,
wherein the user weight is calculated based on a user frequency of a corresponding character string in comparison to a sum of all user frequencies of historical replacement character strings,
wherein the community weight is calculated based on a community frequency of a corresponding character string in comparison to a sum of all community frequencies of the historical replacement character strings,
wherein the plurality of users comprises the particular user, and
wherein the combined weighted frequencies comprises different frequencies for each user of the community of users.

2. The method of claim 1, wherein the retrieving or receiving comprises retrieving or receiving data from more than one of the plurality of users.

3. The method of claim 1, wherein the data structure comprises a first replacement character string and an associated first frequency.

4. The method of claim 3, wherein the data structure further comprises a second replacement character string and an associated second frequency.

5. The method of claim 4, wherein the providing comprises ranking the first replacement character string and the second replacement character string based upon the first frequency and second frequency.

6. The method of claim 5, wherein the providing further comprises displaying the first replacement character string and the second replacement character string in an order based upon the ranking.

7. The method of claim 1, wherein the updating comprises incrementing a frequency value of a selected one of the at least one replacement character string.

8. The method of claim 1, further comprising:
tracking frequencies of the historical replacement character strings for the particular user and the community of users; and
providing a list of "n" number of the historical replacement character strings in response to a character string that was previously changed or is not recognized.

9. A computer program product comprising a non-transitory computer useable medium having a computer readable program, wherein the computer readable program when executed on a computer causes the computer to:
tracking frequencies of historical replacement character strings for a particular user and at least one of the plurality of users;
identify an unrecognized or previously changed character string;
provide at least one replacement character string for the unrecognized or previously changed character string based upon data associated with historical replacements of the unrecognized or previously changed character string;
replace the character string; and
update the data based upon the replacement,
wherein the providing the at least one replacement character string comprises:
weighting respective frequencies of the particular user and the at least one of the plurality of users to generate a user weight for the particular user and a community weight for the at least one of the plurality of users;
combining the respective weighted frequencies of the particular user and the at least one of the plurality of users by summing the user weight for the particular user and the community weight for the at least one of the plurality of users; and
ordering the at least one replacement character string in a list based on the combined weighted frequencies,
wherein the user weight is calculated based on a user frequency of a corresponding character string in comparison to a sum of all user frequencies of the historical replacement character strings,
wherein the community weight is calculated based on a community frequency of a corresponding character string in comparison to a sum of all community frequencies of the historical replacement character strings,
wherein the plurality of users comprises the particular user, and
wherein the combined weighted frequencies comprises different frequencies for each user of the community of users.

10. The computer program product of claim 9, wherein:
the at least one replacement character string comprises a first replacement character string and a second replacement character string,
the data comprises a first replacement frequency of the first replacement character string and a second replacement frequency of the second replacement character string.

11. The computer program product of claim 10, wherein the providing comprises ranking the first replacement character string and the second replacement character string based upon the first replacement frequency and the second replacement frequency.

12. The computer program product of claim 10, wherein the providing comprises displaying the first replacement character string and the second replacement character string in an order based upon the first replacement frequency and the second replacement frequency.

13. The computer program product of claim 10, wherein the updating comprises incrementing a value of the first replacement frequency or the second replacement frequency.

14. A system comprising a server having a database containing data associated with historical replacements of character strings, and at least a hardware component for checking spelling, the system operates to:
receive character string replacement data from a plurality of users;
identify an unrecognized or previously replaced character string in electronic text;
provide, based upon the data associated with historical replacement of character strings, at least one replacement character string for the unrecognized or previously replaced character string,
wherein the providing the at least one replacement character string comprises:
weighting respective frequencies of a particular user and the at least one of the plurality of users to generate a user weight for the particular user and a community weight for the at least one of the plurality of users;
combining the respective weighted frequencies of the particular user and the at least one of the plurality of users by summing the user weight for the particular user and the community weight for the at least one of the plurality of users; and
ordering the at least one replacement character string in a list based on the combined weighted frequencies;
wherein the user weight is calculated based on a user frequency of a corresponding character string in comparison to a sum of all user frequencies of historical replacement character strings,
wherein the community weight is calculated based on a community frequency of a corresponding character string in comparison to a sum of all community frequencies of the historical replacement character strings, wherein the plurality of users comprises the particular user, wherein the combined weighted frequencies comprises different frequencies for each user of the community of users, and wherein the at least one replacement character string includes a list of "n" number of the historical replacement character strings.

15. The system of claim 14, wherein the system further operates to:

receive character string replacement data from plural users; and update the database based upon the received character string replacement data.

16. The system of claim 14, wherein the database comprises an open-standards database that is arranged to receive character string replacement data from different software applications.

17. The system of claim 14, the data comprises replacement character string and associated frequencies.

18. A computer system for at least one of modeling and forecasting technology adoption, the system comprising:

a processor, a memory and a computer readable medium;

first program instructions to track frequencies of historical replacement character strings; and second program instructions to provide a list of "n" number of the historical replacement character strings in response to a character string which was previously changed or is not recognized, wherein the providing the list of "n" number of the historical replacement character strings comprises:

weighting the respective frequencies of the particular user and at least one of a plurality of users;

combining the respective weighted frequencies of the particular user and the at least one of the plurality of users; and ordering the at least one replacement character string in a list based on the combined weighted frequencies;

third program instructions to maintain a list of misspelled words and replacements that have been selected or input for replacing the respective misspelled words, wherein the lists of the misspelled words and replacements are stored in local memory or remotely in a database, wherein:

the misspelled words are identified by comparing to a predefined list of words by hashing the word and comparing the misspelled words to a hashing table that corresponds to a predefined list;

replacement history data for correcting the misspelled word or a previously changed word is provided in a table, wherein a column shows the misspelled word as the misspelled words was entered, another column shows the word that is selected to replace the misspelled word and a further column shows a frequency of replacement;

tracking the history of replacements for a particular misspelled or previously changed word, a spell checker presents the "n" most frequent replacements the next time the word is misspelled or recognized as a word which was previously changed;

wherein the "n" most frequent replacements are in ranked descending order beginning with a most frequent replacement at a top of the list;

the replacement history for a particular misspelled word or word which was previously changed is seeded with a list of initial replacement words, wherein the initial replacement words are determined using spell checking routines; and wherein the first, second and third program instructions are stored on the computer readable medium for execution by the processor via the memory.

19. The computer system of claim 18, wherein a value of the "n" number is an integer greater than zero and is set by one of a system designer, an administrator, and a user.

20. The computer system of claim 18, wherein the at least one of the plurality of users is a community of users.

* * * * *